J. G. ROBERTS.
HOOK FOR TIRE CHAINS.
APPLICATION FILED APR. 26, 1919.
1,314,832.
Patented Sept. 2, 1919.
Fig. 1.
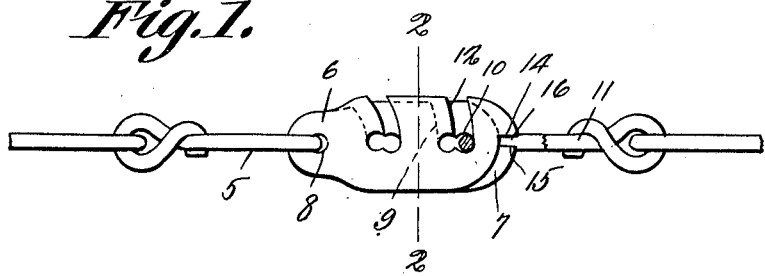
Fig. 2.
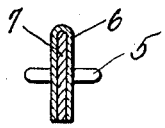
Fig. 3.
Fig. 4.
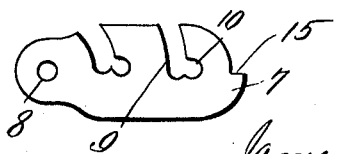
Inventor,
James G. Roberts.
By Marks Aumerney
Attorney

UNITED STATES PATENT OFFICE.

JAMES G. ROBERTS, OF ALTON, KANSAS.

HOOK FOR TIRE-CHAINS.

1,314,832.   Specification of Letters Patent.   Patented Sept. 2, 1919.

Application filed April 26, 1919. Serial No. 292,772.

*To all whom it may concern:*

Be it known that I, JAMES G. ROBERTS, a citizen of the United States of America, and resident of Alton, in the county of Osborne and State of Kansas, have invented certain new and useful Improvements in Hooks for Tire-Chains, of which the following is a specification.

This invention relates to snap hooks and particularly to hooks of this character designed primarily for use as joints or connections between the ends of tire chains or what are commonly known as antiskid chains.

An object of this invention is to produce novel means by which the link of the chain which is detachably connected to the snap hook is guarded from accidental dislodgment and whereby the elements of members of the snap hook are held against oscillatory movement with respect to each other or said link.

A further object of this invention is to produce a link of the character indicated which will permit the application or removal of the link with facility while at the same time the said link has the advantages indicated in that tire chains cannot be accidentally dislodged by reason of the disengagement of the link from the snap hook which occurrence is common with snap hooks, now in general use.

A still further object of this invention is to produce a snap hook of the character indicated which can be made expeditiously and almost wholly by the stamping process so that the cost of production will be minimized.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification whereby like characters denote corresponding parts in the several views, and in which—

Figure 1 illustrates a view in elevation of a snap hook showing the same closed, fastening a chain;

Fig. 2 illustrates a sectional view on the line 2—2 of Fig. 1 and

Fig. 3 illustrates a view in elevation showing the sections of the hook moved from their normally locked position to positions which permit the removal of the link which is to be disengaged therefrom.

Fig. 4 illustrates a side elevation of one of the plates.

In these drawings 5 denotes a link of a chain which constitutes a pivot for the members 6 and 7 of the hook, it being shown that there is an aperture or clearance 8 in which the link is inserted and this aperture or clearance is produced by forming alining apertures in the two members.

The outer member 6 in the present embodiment of the invention consists of a body bent on itself to form what might be termed a housing which embraces one edge of the member 7 making what might be termed a plate on each side of the housing but it will be apparent that the said member 6 may consist of a plate lying on one side only of the member 7.

The plate 7 has an approximately transversely disposed slot 9 terminating in a notch or seat 10 and for the purpose of affording adjustments, these slots may be increased in number so that a link 11 may be inserted in either of said slots when the snap hook is locked. The present illustration shows two slots but, they may be increased of course to suit particular requirements according to the size of the snap hook to be made.

The member 6 has an approximately transversely disposed slot 12 for each slot 9 of the companion member and each of the said slots 12 has a notch or recess 13 at its inner end which is offset in a direction opposite to the direction of the offset 10 of the slot 9. The slot 12 does not aline or register with the slot 9 but the recess of offset 10 of the slot 9 registers with the slot 12 when the sections of the snap hook are closed, as in Fig. 1, and the offset or notch 13 of the slot 12 registers or alines with the slot 9.

When the link is inserted in the snap hook, any pull on the snap hook results in more firmly holding the members of the snap hook in locked or operative position and when the link is in the notch or offset 10 the shoulder formed by the notch prevents upward movement of the link. When, however, it is desired to unlock the snap hook and release the link, the link is moved rearwardly from the notch 10 into the notch 13 which is in alinement with the slot 9, and that permits the link to travel in the clearance produced by the slot 9 so that the members of the snap hook may oscillate to the open position shown in Fig. 3 and of course when the snap hook is to be locked to retain the link, a reverse movement of the parts would be effective to produce that result.

As shown in the drawing, the member 6 has a shoulder or lug 14 and the member 7 has a shoulder or lug 15 which are in such relation to each other as to produce or effect a clearance 16 when the sections of the snap hook are in operative position to hold the link and these shoulders prove effective as abutments for an instrument which may be inserted in the space 16 for the purpose of prying the members to move them on the pivot, or to oscillate them so that they will open to the position shown in Fig. 3 to release the link.

I claim:

1. In a hook for tire chains, two members having coinciding apertures for the reception of a pivot, an approximately transversely disposed slot in one of the members terminating in an offset extending longitudinally of the said member, the other of said members having an approximately transversely disposed slot extending from its edge corresponding to the edge of the other member having the slot, but out of alinement with the slot of the first mentioned member and terminating in an offset in a direction opposite to the direction of the offset in the first mentioned member so that the offset of one member alines with the slot of the other member.

2. A chain connection of the character indicated, members, a link on which the said members are pivotally mounted, approximately transversely disposed slots extending from corresponding edges of the said member, the said slots being out of alinement, each of said members having recesses offset with relation to its slot and communicating therewith, the offset in one member registering with the slot of the coacting member.

3. A chain connection of the character indicated, members, a link on which said members are pivotally mounted, approximately transversely disposed slots extending from corresponding edges of the said member, the said slots being out of alinement, each of said members having recesses offset with relation to its slot and communicating therewith, the offset in one member registering with the slot of the coacting member, and shoulders formed on the said members in spaced relation to each other to produce a clearance for engagement of a tool.

JAMES G. ROBERTS.

Copies of this patent may be obtained for five cents each, by addressing the "Commissioner of Patents, Washington, D. C."